US012342957B2

(12) United States Patent
Rose et al.

(10) Patent No.: US 12,342,957 B2
(45) Date of Patent: Jul. 1, 2025

(54) COOKER HEATING BELT

(71) Applicant: Breville Pty Limited, Alexandria (AU)

(72) Inventors: Vyvyan Rose, Alexandria (AU); David Gargiulo, Alexandria (AU)

(73) Assignee: Breville Pty Limited, Alexandria (AU)

( * ) Notice: Subject to any disclaimer, the term of this patent is extended or adjusted under 35 U.S.C. 154(b) by 822 days.

(21) Appl. No.: 17/621,542

(22) PCT Filed: Jun. 26, 2020

(86) PCT No.: PCT/AU2020/050652
§ 371 (c)(1),
(2) Date: Dec. 21, 2021

(87) PCT Pub. No.: WO2020/257863
PCT Pub. Date: Dec. 30, 2020

(65) Prior Publication Data
US 2022/0354301 A1    Nov. 10, 2022

(30) Foreign Application Priority Data
Jun. 28, 2019 (AU) .................................. 2019902264

(51) Int. Cl.
*A47J 36/24* (2006.01)
*H05B 3/34* (2006.01)

(52) U.S. Cl.
CPC ............ *A47J 36/2483* (2013.01); *H05B 3/34* (2013.01)

(58) Field of Classification Search
CPC ................................ A47J 36/2483; H05B 3/34
USPC ......................................................... 99/483
See application file for complete search history.

(56) References Cited

U.S. PATENT DOCUMENTS

| 2009/0099631 | A1 | 4/2009 | Augustine |
| 2016/0021704 | A1 | 1/2016 | Elverud |
| 2016/0367061 | A1* | 12/2016 | Chou .................. A47J 36/2483 |
| 2017/0138797 | A1 | 5/2017 | Brown et al. |
| 2019/0167034 | A1 | 6/2019 | Walsh |

FOREIGN PATENT DOCUMENTS

| CA | 2579410 A1 | 8/2007 |
| EP | 2988571 A1 | 2/2016 |
| KR | 20090005436 U * | 11/2007 .......... A47J 36/2483 |
| KR | 101964728 B1 | 4/2019 |
| SE | 1100375 A1 | 1/2012 |

OTHER PUBLICATIONS

International Search Report for application No. PCT/AU2020/050652 dated Jul. 27, 2020.
European Search Report and Written Opinion for the European Application No. EP20833408, mailed Jul. 7, 2023, 9 pages.

* cited by examiner

*Primary Examiner* — Phuong T Nguyen
(74) *Attorney, Agent, or Firm* — KDW Firm PLLC

(57) ABSTRACT

A heater to heat a container within which food is to be cooked. The heater includes a flexible elongated base that is to at least partly surround the container periphery, so that the heater can be urged towards the periphery. A heating element is attached to the base of the container to enable the heating element to be in thermal contact with the periphery. An elongated power conduit is connected to the heating element to provide for the connection of the heating element to a source of electric power so that upon electric power being delivered to the heating element, the heating element can heat the container.

7 Claims, 2 Drawing Sheets

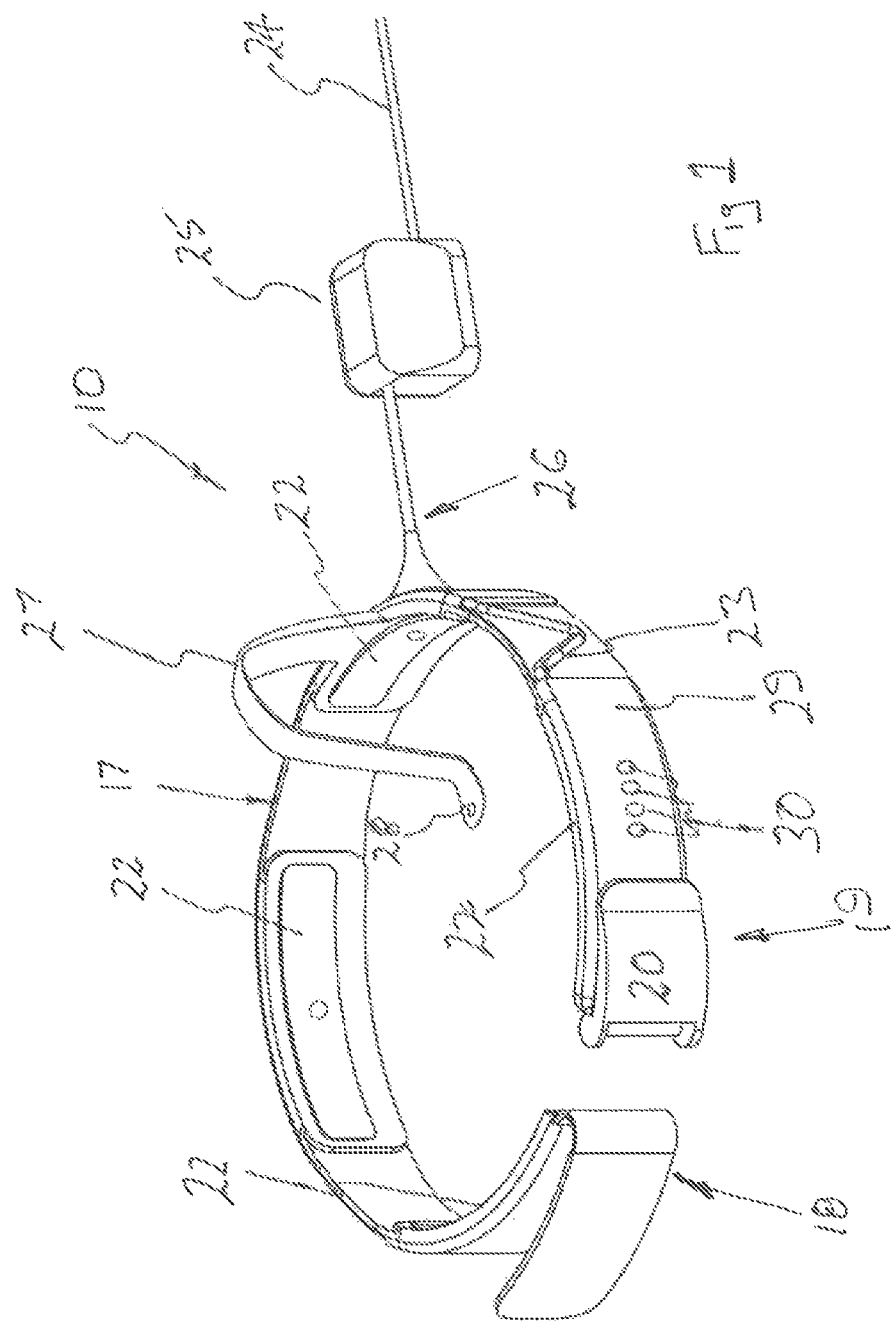

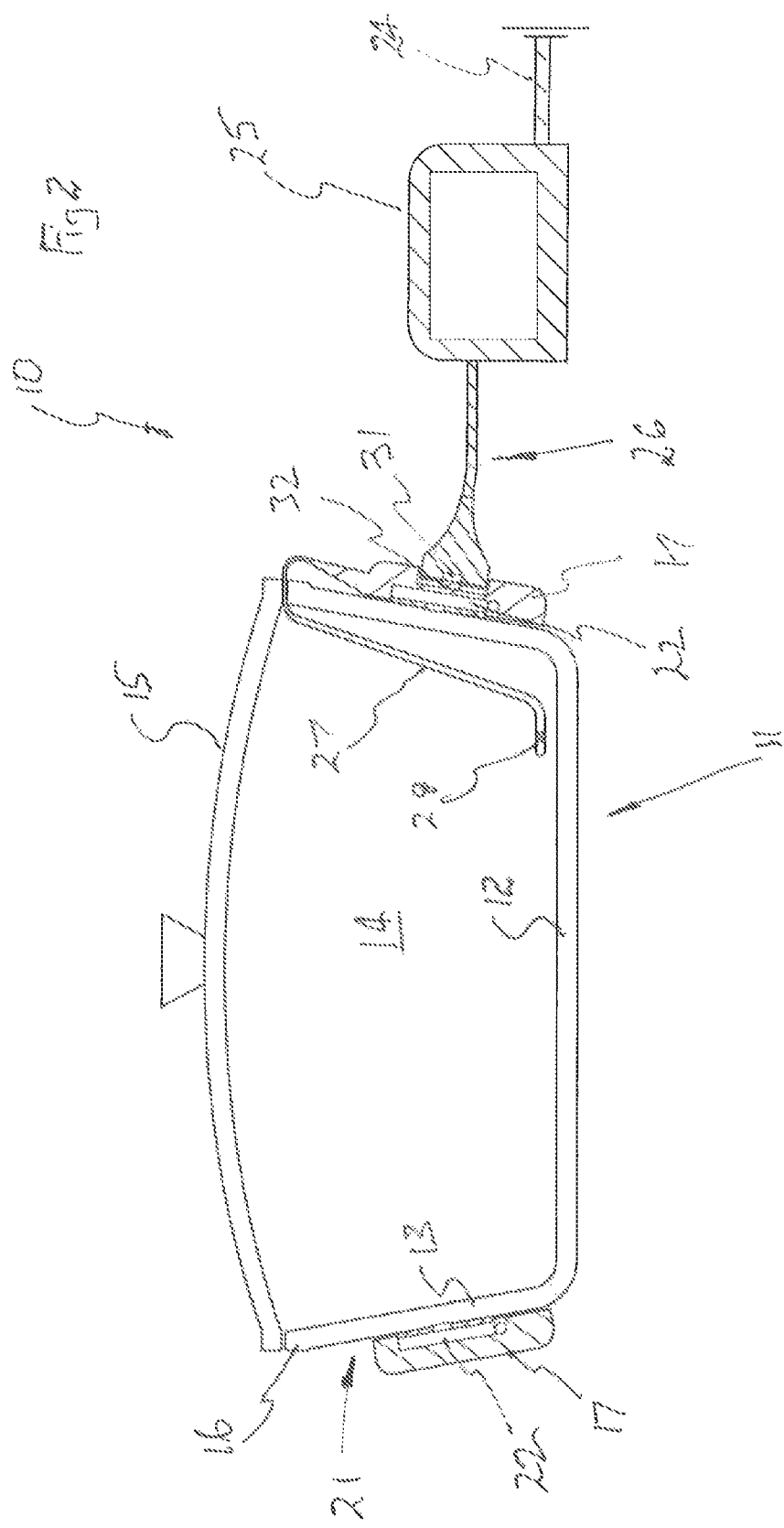

COOKER HEATING BELT

CROSS-REFERENCE TO RELATED APPLICATIONS

This application is a national stage application filed under 35 U.S.C. 371 claiming the benefit of and priority to international patent application no. PCT/AU2020/050652, filed Jun. 26, 2020, which also claims priority to Australian national patent application No. 2019902264, filed on Jun. 28, 2019, each of which are incorporated herein by reference in their entireties.

FIELD

The present invention relates to heaters for cooking appliances, and more particularly to heaters that can be applied to cooking vessels of various sizes to heat the vessel.

BACKGROUND

Cookers, such as slow cookers, have a number of disadvantages including the significant space for storage. A further disadvantage is that they are not easily transported due to their size.

A still further disadvantage is that more than one size slow cooker is needed, a user needs to purchase a range of sizes thereby significantly increasing the costs.

OBJECT

It is the object of the present invention to overcome or substantially ameliorate at least one of the above disadvantages.

SUMMARY OF INVENTION

There is disclosed herein a heater for a container that is to receive a food to be cooked by the heater applying heat to the container, the container having a side wall or walls that provide a periphery surrounding a cavity within which the food is located, the heater including:
  a flexible elongated base that is to at least partly surround the periphery, so that the heater can be urged towards the periphery;
  at least one heating element attached to the base to enable the heating element to be in thermal contact with the periphery; and
  an elongated power conduit connected to the heating element and to provide for the connection of the heating element to a source of electric power so that upon electric power being delivered to the heating element, the heating element can heat the container.

Preferably, the base is flexible and is resiliently deformed to be urged into contact with the periphery.

Preferably, the heating element is a first heating element, and the heat includes a second heating element, spaced from the first heating element.

Preferably, the conduit includes a first length extending to the base, and at least one second length extending longitudinally of the base, with the second length being elongatable longitudinally relative to the base.

Preferably, the heater includes a controller, providing a user interface, connected to the power conduit and that is operated by a user to provide for the delivery of electric power to each heating element.

Preferably, the heater includes a temperature sensor attached to the base and locatable in the cavity to provide a signal indicative of food temperature within the cavity, with the sensor being in communication with the controller to deliver the signal thereto.

Preferably, the sensor is a temperature wireless sensor that communicates with the controller wirelessly.

BRIEF DESCRIPTION OF DRAWINGS

A preferred form of the present invention will now be described by way of example with reference to the accompanying drawings wherein:
  FIG. 1 is a schematic isometric view of a cooking appliance; and
  FIG. 2 is a schematic parts sectioned side elevation of the cooking appliance of FIG. 1 applied to a container.

DESCRIPTION OF EMBODIMENTS

In the accompanying drawings there is schematically depicted a heater 10 to heat a container 11 within which food is to be cooked. The container 11 includes a bottom wall 12 and a side wall 13, with the side wall 13 providing a periphery 21 surrounding a cavity 14 that receives food to be cooked.

The heater 10 is applied to the container 11 to heat the food contained in the cavity 14.

The heater 10 includes an elongated flexible base 17 that is resiliently deformable, and that at least partly surround the side periphery 21 when applied thereto.

In this embodiment the base 17 has end extremities 18 and 19 that are secured together by means of a catch 20 that engages the end extremity 18 to secure the base 17 about the periphery 21.

Preferably the end extremity 18 is elongated, so that the effective length of the heater 10 can be adjusted to the size of the container 11.

The heater 10 includes at least one heating element 22. In this embodiment, there are four heating elements 22 located at spaced intervals along the base 17. Preferably the heating elements 22 are longitudinally elongated in the longitudinal direction of extension of the base 17.

Attached to the base 17 is a plurality of elongated and flexible power conduits 23 that extend between the heating elements 22, and connect each of the heating elements 22 to a power cord 24 that is connected to the power conduits 23 via a controller 25, that includes a user interface and a coupling 26.

The power conduits 23 are configured, and more particularly, are shaped to provide for elongation of the base 17.

Attached to the base 17 is an elongated, and preferably flexible attachment part 27, provided at its end extremity with a temperature sensor 28. The part 27 enables the sensor 28 to be located within the cavity 14 so as to provide a signal indicative of the temperature of the food within the cavity 14. The temperature sensor 28, via wires within the part 27, are connected to the coupling 26 and therefore the controller 25. In another embodiment, the sensor 28 is in wireless communication with the controller 25.

In a further preferred form, the base 17 could be provided with a display 29 that includes a plurality of light emitting portions 30 that may be of different colours, and provide an indication to the user of the particular operation being determined and provided by the user operating the controller 25.

In one preferred embodiment, the coupling 26 may include a magnet 31 that is attracted to a further magnet, or ferro magnetic material 32 to secure the coupling 26 to the base 17.

The controller (user interface) 25 is operated by the user to govern the delivery of electric power to the heating elements 21 to determine temperature, and timing. In another embodiment, the controller 25 is operated wirelessly via a mobile device such as a phone.

Preferably the base 17 substantially surrounds each of the heating elements 22 to minimise heat loss away from the container 11. Preferably only one major face of each heating element 22 is exposed for heat transfer to the container 11.

The above described preferred embodiment has a number of advantages including the heater 10 being usable with different size containers 11, as well as containers of different configurations. It enables the user to employ containers they already have, and use a container or containers which they are of the view provides them with improved outcomes in respect of cooking. A still further advantage is that the heater 10 is collapsible due to the flexibility of the base 17, and therefore is easily stored and easily transported.

The invention claimed is:

1. A cooking appliance comprising:
   a container that is to receive a food to be cooked, the container having a side wall or walls that provide a periphery surrounding a cavity within which the food is located; and
   a heating belt configured to apply heat to the container to cook the food in the container, the heating belt including:
      a flexible elongated base that is to at least partly surround the periphery, so that the heating belt can be urged towards the periphery, wherein the flexible elongated base includes end extremities that are elongated so that the effective length of the heating belt is adjustable to the size of the container;
      at least one heating element attached to the base to enable the heating element to be in thermal contact with the periphery, wherein only one major face of the heating element is exposed to the periphery for heat transfer to the container; and
      an elongated power conduit connected to the heating element and to provide for the connection of the heating element to a source of electric power so that upon electric power being delivered to the heating element, the heating element heats the container, wherein the conduit is flexible to provide for the elongation of the base.

2. The cooking appliance of claim 1, wherein the base is resiliently deformable to be urged into contact with the periphery.

3. The cooking appliance of claim 1, wherein the heating element is a first heating element, and the heating belt includes a second heating element, spaced from the first heating element.

4. The cooking appliance of claim 1, wherein the conduit includes a first length extending to the base, and at least one second length extending longitudinally of the base, with the second length being elongatable longitudinally relative to the base.

5. The cooking appliance of claim 1, wherein the heating belt includes a controller, providing a user interface, connected to the power conduit and that is operated by a user to provide for the delivery of electric power to each heating element.

6. The cooking appliance of claim 1, wherein the heating belt includes a temperature sensor attached to the base and locatable in the cavity to provide a signal indicative of food temperature within the cavity, with the sensor being in communication with a controller to deliver the signal thereto.

7. The cooking appliance of claim 6, wherein the sensor is a wireless temperature sensor that communicates with the controller wirelessly.

* * * * *